(12) United States Patent
Beckett

(10) Patent No.: US 11,273,367 B1
(45) Date of Patent: Mar. 15, 2022

(54) NON-CRT POINTING DEVICE

(71) Applicant: Wayne Hughes Beckett, North Point (HK)

(72) Inventor: Wayne Hughes Beckett, North Point (HK)

( * ) Notice: Subject to any disclaimer, the term of this patent is extended or adjusted under 35 U.S.C. 154(b) by 21 days.

(21) Appl. No.: 17/024,399

(22) Filed: Sep. 17, 2020

Related U.S. Application Data

(60) Provisional application No. 62/904,991, filed on Sep. 24, 2019.

(51) Int. Cl.

| | | |
|---|---|---|
| *A63F 13/213* | (2014.01) | |
| *G06F 3/038* | (2013.01) | |
| *G06F 3/0481* | (2013.01) | |
| *H04N 5/225* | (2006.01) | |
| *G06T 7/73* | (2017.01) | |
| *G06K 9/00* | (2006.01) | |
| *A63F 13/245* | (2014.01) | |
| *A63F 13/837* | (2014.01) | |
| *A63F 13/22* | (2014.01) | |
| *G06T 7/90* | (2017.01) | |
| *G06F 3/04817* | (2022.01) | |

(52) U.S. Cl.
CPC ............ *A63F 13/213* (2014.09); *A63F 13/22* (2014.09); *A63F 13/245* (2014.09); *A63F 13/837* (2014.09); *G06F 3/038* (2013.01); *G06F 3/04817* (2013.01); *G06K 9/00664* (2013.01); *G06T 7/73* (2017.01); *G06T 7/90* (2017.01); *H04N 5/2257* (2013.01); *A63F 2300/1018* (2013.01); *A63F 2300/1043* (2013.01); *A63F 2300/1087* (2013.01); *A63F 2300/8076* (2013.01)

(58) Field of Classification Search
CPC ...... A63F 13/213; A63F 13/22; A63F 13/245; A63F 13/837; G06T 7/73; G06T 7/90; G06F 3/038; G06F 3/04817; G06K 9/00664; H04N 5/2257
See application file for complete search history.

(56) References Cited

U.S. PATENT DOCUMENTS 5,793,361 A * 8/1998 Kahn .................. G06F 3/03542
345/1.3
5,796,387 A * 8/1998 Curran .................... A63F 13/04
345/158

(Continued)

*Primary Examiner* — Reginald A Renwick
(74) *Attorney, Agent, or Firm* — QuickPatents, LLC; Kevin Prince

(57) ABSTRACT

A system for detecting an aim point on a display screen targeted by a user comprises a microcomputer that has at least a power source, a processor, a non-volatile memory, an I/O interface, and a display output. A hand held enclosure includes a camera having a field-of-view defined by an X-axis and a Y-axis, a user input, and a microcomputer interface to transmit camera data and user input data to the microcomputer. The aim point is a point located centrally in the field-of-view. The microcomputer is adapted to display two or more reference icons on the display screen, detect the reference icons using the camera, calculate the aim point on the display screen based on the position of the reference icons within the field-of-view of the camera, perform a function based on user input settings and the calculated value of the aim point, and repeat the process as necessary.

17 Claims, 2 Drawing Sheets

(56) References Cited

U.S. PATENT DOCUMENTS

| | | | | |
|---|---|---|---|---|
| 5,896,125 A * | 4/1999 | Niedzwiecki | G06F 3/023 | 345/168 |
| 6,224,493 B1 * | 5/2001 | Lee | A63B 69/3614 | 473/221 |
| 6,307,534 B1 * | 10/2001 | Honjyou | G06F 3/038 | 345/156 |
| 6,640,337 B1 * | 10/2003 | Lu | H04N 21/42204 | 725/39 |
| 6,816,151 B2 * | 11/2004 | Dellinger | G06F 3/014 | 345/161 |
| 6,821,204 B2 * | 11/2004 | Aonuma | A63F 13/10 | 463/32 |
| 6,843,726 B1 * | 1/2005 | Nomi | A63F 13/54 | 463/43 |
| 6,850,221 B1 * | 2/2005 | Tickle | G06F 3/0338 | 345/157 |
| 7,102,616 B1 * | 9/2006 | Sleator | H04N 21/42222 | 345/158 |
| 7,331,856 B1 * | 2/2008 | Nakamura | A63F 13/00 | 463/7 |
| 7,351,148 B1 * | 4/2008 | Rothschild | A63F 9/24 | 463/1 |
| 7,684,958 B2 * | 3/2010 | Ohta | G01C 22/006 | 702/160 |
| 7,874,918 B2 * | 1/2011 | Osnato | A63F 13/428 | 463/36 |
| 7,927,216 B2 * | 4/2011 | Ikeda | A63F 13/235 | 463/38 |
| 7,952,560 B2 * | 5/2011 | Yoo | G06F 3/0433 | 345/158 |
| 7,980,952 B2 * | 7/2011 | Ohta | A63F 13/10 | 463/36 |
| 8,089,455 B1 * | 1/2012 | Wieder | G06F 3/0386 | 345/156 |
| 8,157,651 B2 * | 4/2012 | Ohta | A63F 13/426 | 463/37 |
| 8,291,346 B2 * | 10/2012 | Kerr | G09G 5/373 | 715/856 |
| 8,300,011 B2 * | 10/2012 | Chao | G09G 5/08 | 345/158 |
| 8,308,563 B2 * | 11/2012 | Ikeda | A63F 13/10 | 463/37 |
| 8,441,440 B2 * | 5/2013 | Makita | G06F 3/0346 | 345/157 |
| 8,535,132 B2 * | 9/2013 | Shimamura | A63F 13/10 | 463/2 |
| 8,784,203 B2 * | 7/2014 | Zalewski | G06F 3/0304 | 463/31 |
| 8,913,003 B2 * | 12/2014 | Grunnet-Jepsen | G06F 3/0421 | 345/156 |
| 9,035,160 B2 * | 5/2015 | Rapp | G10D 13/12 | 84/104 |
| 9,383,814 B1 * | 7/2016 | Capper | G06F 3/00 | |
| 9,430,997 B2 * | 8/2016 | Hardi | G10D 13/12 | |
| 9,539,507 B2 * | 1/2017 | Schoenith | A63F 13/24 | |
| 9,586,120 B1 * | 3/2017 | Sotelo | A63H 13/06 | |
| D795,959 S * | 8/2017 | Chen | D21/333 | |
| 2002/0055383 A1 * | 5/2002 | Onda | A63F 13/212 | 463/36 |
| 2002/0065121 A1 * | 5/2002 | Fukunaga | A63F 13/5255 | 463/8 |
| 2004/0029640 A1 * | 2/2004 | Masuyama | A63F 13/92 | 463/43 |
| 2005/0014542 A1 * | 1/2005 | Ueshima | A63F 13/235 | 463/8 |
| 2005/0017454 A1 * | 1/2005 | Endo | A63F 13/285 | 273/317.1 |
| 2005/0174324 A1 * | 8/2005 | Liberty | G06F 3/0346 | 345/156 |
| 2006/0092133 A1 * | 5/2006 | Touma | G06F 3/04815 | 345/158 |
| 2006/0152489 A1 * | 7/2006 | Sweetser | G06F 3/0325 | 345/158 |
| 2006/0178212 A1 * | 8/2006 | Penzias | G06F 3/033 | 463/37 |
| 2006/0258454 A1 * | 11/2006 | Brick | A63F 13/40 | 463/36 |
| 2007/0080934 A1 * | 4/2007 | Chen | G06F 3/0383 | 345/156 |
| 2007/0117625 A1 * | 5/2007 | Marks | G06F 3/0346 | 463/30 |
| 2007/0265088 A1 * | 11/2007 | Nakada | A63F 13/04 | 463/37 |
| 2007/0270215 A1 * | 11/2007 | Miyamoto | A63F 13/837 | 463/32 |
| 2008/0132334 A1 * | 6/2008 | Nonaka | A63F 13/10 | 463/37 |
| 2008/0227546 A1 * | 9/2008 | Roberts | A63F 13/212 | 463/38 |
| 2008/0280660 A1 * | 11/2008 | Ueshima | A63F 13/08 | 463/3 |
| 2009/0005166 A1 * | 1/2009 | Sato | A63F 13/10 | 463/37 |
| 2009/0017909 A1 * | 1/2009 | Yamada | A63F 13/577 | 463/32 |
| 2009/0048021 A1 * | 2/2009 | Lian | G06F 3/011 | 463/37 |
| 2009/0191968 A1 * | 7/2009 | Johnson | A63F 13/10 | 463/37 |
| 2009/0298590 A1 * | 12/2009 | Marks | A63F 13/23 | 463/37 |
| 2010/0009746 A1 * | 1/2010 | Raymond | A63F 13/10 | 463/31 |
| 2010/0113153 A1 * | 5/2010 | Yen | A63F 13/06 | 463/37 |
| 2010/0160048 A1 * | 6/2010 | Rabin | A63F 13/95 | 463/43 |
| 2011/0195777 A1 * | 8/2011 | Abe | A63F 13/837 | 463/30 |
| 2012/0194422 A1 * | 8/2012 | El Dokor | A63F 13/428 | 345/156 |
| 2016/0279514 A1 * | 9/2016 | Fung | A63F 13/816 | |

* cited by examiner

NON-CRT POINTING DEVICE

CROSS-REFERENCE TO RELATED APPLICATIONS

This application claims the benefit of U.S. Provisional Patent Application 62/904,991, filed on Sep. 24, 2019, and incorporated herein by reference.

STATEMENT REGARDING FEDERALLY SPONSORED RESEARCH AND DEVELOPMENT

Not Applicable.

FIELD OF THE INVENTION

This invention relates to computer pointing devices, and more particularly to a pointing device for use with a non-CRT display.

BACKGROUND

In the days where CRT (Cathode Ray Tube) displays were the norm, the image was produced on the screen by an electron beam controlled by vertical and horizontal electromagnets. This would display a single dot on the screen which would start at the top left of the screen and then progress across the screen from left to right. The electron beam would then turn off briefly while the electromagnets adjust to the next line down horizontally during what is known as Horizontal Flyback. The image itself is only one dot (or perhaps 3 dots for color). The entire TV image appears on the eyes by a combination of a phosphorus coating on the TV screen causing a persistent glow, and our own persistence of vision.

Pointing devices such as light guns and light pens worked on CRT displays by measuring the time taken before the light emitted by the collision of the electron beam striking the phosphor coating. A light sensor on the device detects the time of the brightest value. The X and Y co-ordinates of the pointer could be calculated by X=(Total Time since Start of display) Modulus (Time required for one row) Y=(Total Time since Start of display)/(Time required for one row).

In this way a light gun for example could be used to 'shoot' at an image displayed on the screen, such as a duck. A light pen could be used to draw on the screen using a similar method.

As other display technologies have improved such as LCD and Plasma, CRT displays have all but disappeared. There is no longer a single raster beam to display a dot on the screen. A screen is now made up of millions of LEDs. These are typically red green and blue LEDs so as to be able to display a full color range from black to white. These lights are typically all turned on simultaneously. This makes the old method of pointing devices impossible as there is no longer a raster beam to key off of.

One popular solution to create a pointing device (such as a light gun) is to use a sensor, typically a lens, CCD array and microcontroller unit pointed at the screen. This method requires one or more reference points to 'calibrate' the device. It is common to use lights placed above or below the display pointing towards the sensor. These lights are often infrared so as not to distract the user and also to minimize interference from surrounding light sources.

In the same way that older people suffer from progressive nostalgia about many things such as music or movies being "better in the old days," people are the same about video games. The ones that played when they were young are what people often feel are the best. This creates, as is the case in music and movies, a market for playing older games and so called "retro gaming," which is a very popular pastime. People can spend thousands of dollars on a game that in the 1980's perhaps only cost some 10's of dollars. One type of game that usually cannot be played on modern, non-CRT screens without difficulty is gun-type games. Classic games such as Duck Hunt, Time Crises, and many other games cannot be played as raster timing cannot be used, since modern LED screens do not use a raster beam to excite a pigment on the screen.

"Emulation" is a way of playing older games with great accuracy by using programs to translate from older hardware to more modern and faster processors. Software is used to emulate older hardware and the software of the older game is translated to work with modern hardware. As a modern emulator is merely a program that translates the game software, many extra items can be added to such a program, including image filters such as up-scalers, adding cheat facilities and so on.

Therefore, there is a need for a system that displays reference points to an image displayed on a display screen that can be used to calculate which direction the user is pointing a camera device towards the display, that is, an aim point. Such a needed device, instead of requiring a light source, would simply overlay the reference points onto the game screen. Such a needed system would provide aim point and user input information, such as a trigger actuation, to the emulator through an I/O interface. The present invention accomplishes these objectives.

SUMMARY OF THE INVENTION

The present device is a system for detecting an aim point on a display screen targeted by a user. For example, the display screen can be displaying images from a video game, or the like.

The system comprises a microcomputer that has at least a power source, a processor, a non-volatile memory, an I/O interface, and a display output. The I/O interface preferably further includes a camera input, a display output module, and a camera input module.

A hand held enclosure includes a camera having a field-of-view defined by an X-axis and a Y-axis, a user input, and a microcomputer interface to transmit camera data and user input data to the microcomputer. The aim point is a point located centrally in the field-of-view at a value target_X along the X-axis and a value target_Y along the Y-axis. Preferably the hand-held enclosure takes the form of a gun or other weapon.

The microcomputer with the processor is adapted to follow software instructions to perform the following steps:

a) Display two or more reference icons on the display screen.

b) Detect the reference icons using an image captured with the camera and sent to the microcomputer via the I/O interface, and specifically to the camera input module.

c) Calculate the aim point relative position on the display screen based at least in part on the position of the reference icons within the field-of-view of the camera.

e) Perform a function based on user input settings and the calculated value of the aim point.

f) Repeat from step a) until stopped by the user.

Preferably the steps further include step d) display an icon on the display screen at the aim point. Such an icon is preferably a cross-hair icon or reticle. The function performed in step e) is preferably an additional step f) Display one or more images on the display screen corresponding to the user input and the aim point proximate the aim point on the display screen. Such an image may be an explosion graphic or animation, or a bullet hole, or similar image. The user input may be actuation of a trigger on a handgun-shaped hand-held enclosure, for example.

In some embodiments of the invention, the reference icons include orientation information, and the microcomputer through the processor is able to follow software instructions to perform the step c') Calculate the aim point on the display screen based at least in part on the orientation information within the reference icons. Such orientation information may include a color gradient detectable by the system in order to assist in the calculation of orientation. Alternately, or additionally, the reference icons are of various shapes, such as arrows, acute triangles, or the like, which are either symmetrical or non-symmetrical, in order to relay further orientation information to the system.

The present device is a system that displays reference points on an image displayed on a display screen that can be used to calculate which direction the user is pointing a camera device towards the display, that is, an aim point. The present device, instead of requiring a light source, simply overlays the reference points onto the game screen. The present system provides aim point and user input information, such as a trigger actuation, to the emulator through an I/O interface. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
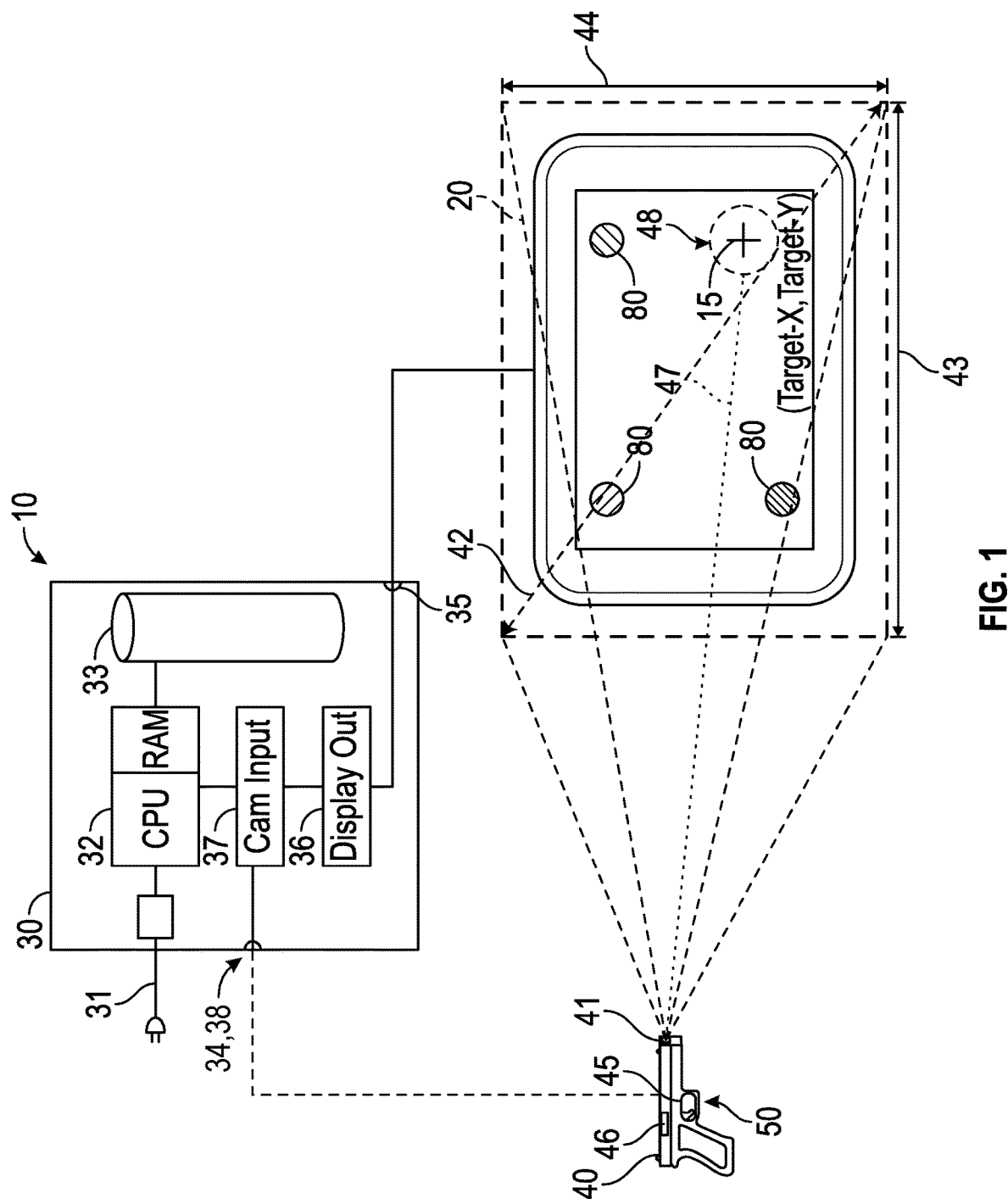
FIG. 1 is a system diagram of the invention.
Figure 2:
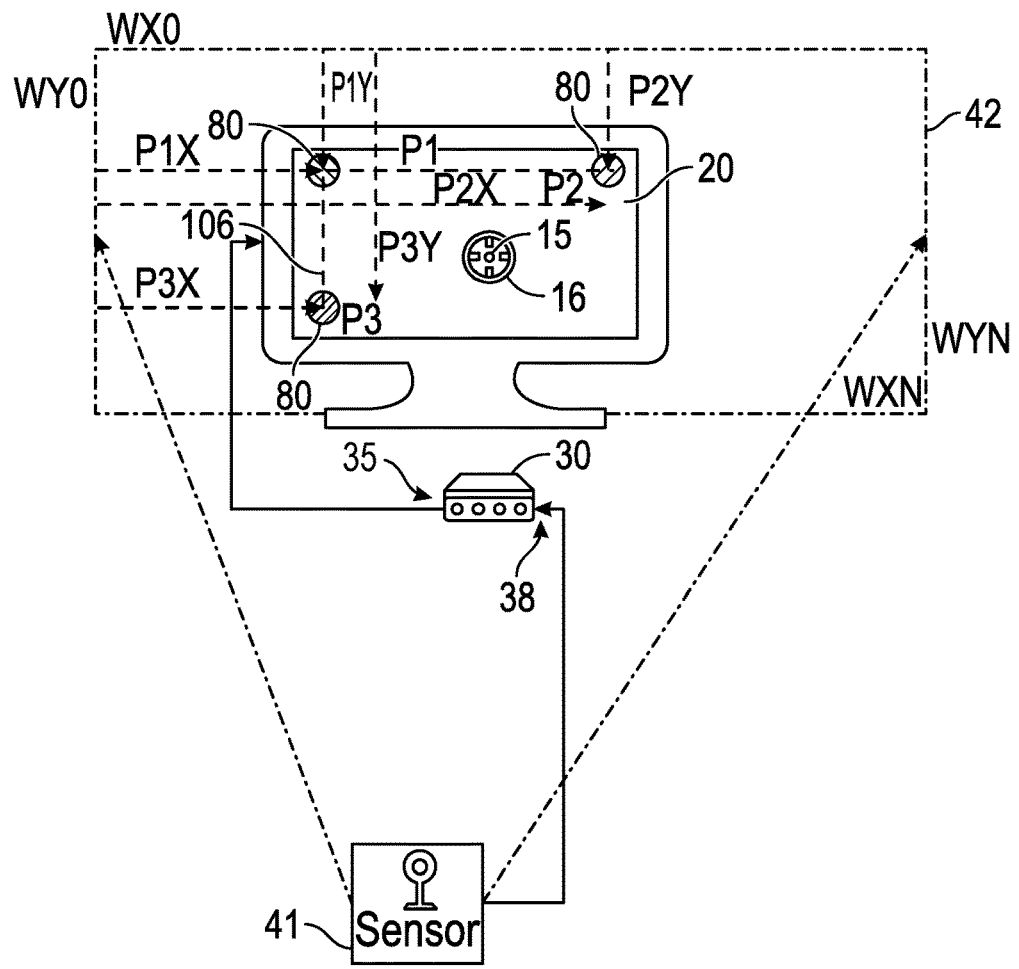
FIG. 2 is a diagram of a display screen and a camera of the invention.

FIGS. 1 and 2 illustrate a system 10 for detecting an aim point 15 on a display screen 20 targeted by a user. For example, the display screen 20 can be displaying images from a video game, or the like.

The system 10 comprises a microcomputer 30 that has at least a power source 31 such as AC line power or a battery (not shown), a processor 32, a non-volatile memory 33, an I/O interface 38, and a display output 35. The I/O interface 38 preferably further includes at least a camera input 34 and a display output 35.

A hand held enclosure 40 includes a camera 41 having a field-of-view 42 defined by an X-axis 43 and a Y-axis 44, a user input 45, and a microcomputer interface 46 to transmit camera data and user input data to the microcomputer 30. The aim point 15 is a point located centrally in the field-of-view 42 at a value target_X along the X-axis and a value target_Y along the Y-axis. Preferably the hand-held enclosure 40 takes the form of a gun 50 or other weapon, a magic wand, or the like.

The microcomputer 30 with the processor 32 is adapted to follow software instructions to perform the following steps:
a) Display two or more reference icons 80 on the display screen.
b) Detect the reference icons 80 using an image captured with the camera 41 and sent to the microcomputer 30 via the I/O interface 38, and specifically to the camera input module 37 through the camera input 34.
c) Calculate the aim point relative position on the display screen 20 based at least in part on the position of the reference icons 80 within the field-of-view 42 of the camera 41.
e) Perform a function based on user input settings and the calculated value of the aim point 15.
f) Repeat from step a) until stopped by the user.

Preferably the steps further include step d) Display an icon 16 (FIG. 2) on the display screen at the aim point 15. Such an icon 15 is preferably a cross-hair icon or reticle.

The function performed in step e) is preferably an additional step f) Display one or more images on the display screen 20 corresponding to the user input 45 and the aim point 15 proximate on the display screen. Such an image 48 may be an explosion graphic or animation, or a bullet hole, or similar image. The user input 45 may be the actuation of a trigger on a handgun-shaped hand-held enclosure 40, for example.

In some embodiments of the invention, the reference icons 80 include orientation information, and the microcomputer 30 through the processor 32 is able to follow software instructions to perform the step c') Calculate the aim point 15 on the display screen 20 based at least in part on the orientation information within the reference icons 80. Such orientation information may include a color gradient detectable by the system 10 in order to assist in the calculation of orientation. Alternately, or additionally, the reference icons 80 are of various shapes, such as arrows, acute triangles, or the like, which are either symmetrical or non-symmetrical, in order to relay further orientation information to the system 10.

Describing FIG. 2 in more detail, the camera 41 is used to point at the display 20. The resolution of the camera 41 is defined by the difference between its maximum and minimum horizontal values (or X coordinates) and maximum and minimum vertical (or Y coordinates). This can be described as {WXN−WX0, WYN−WY0}, or the entire X-axis 43 and the entire Y-axis 44. The base X and Y coordinates are typically defined as 0,0.

The field-of-view 42 of the camera 41 is chosen so that it covers a greater area than the display 20 itself. A choice of camera lenses (not shown) and required distance from the display to the sensor can be chosen to cover the majority of screen sizes.

The aim point 15, which may be visible or invisible on the display depending on the final software, is located anywhere within the viewing area of the sensor {WXN−WX0, WYN−WY0} but is most logically be located at a center of the field of view 42 defined by {(WXN−WX0)/2, (WYN−WY0)/2}.

As the camera 41 is moved by the user, its relative position to the display 20 is calculated in order to determine where the camera 41 is pointing on the display 20. This is done using two or more of the reference icons 80. In the display 20 these have been designated P1, P2 and P3, and additional reference icons 80 can be used to obtain greater accuracy. The reference icons 80 can be any shape, but in practice these are preferably circles as a circle is similar (apart from aspect ratio differences) at any angle of viewing for the display 20. This minimizes the processing required to determine an angle at which the camera 41 is offset against the display 20. Complex reference icons 80, such as those in gameplay, are not likely to be used as a large amount of processing power is required to identify such images. The reference icons P1, P2 . . . PN are not expected to move on the display 20 once calibration has been performed.

In order to calculate an offset of the aim point 15 within the field-of-view 42 of the camera 41, initial calibration is likely to be required. Such an initial calibration can be performed by the user pointing at any point on the display 20 that is known, for example. As the system 10 creates all images on the display 20, pointing at any of the reference icons 80 can be used.

For calibration in this example the user points the camera 41 at P1, P2 . . . PN in sequence. Calibration instructions for the user can be displayed on the display 20. For example, "Point at the Top Left Red Circle and press fire," "Point at the Top Right Green Circle and press fire," etc. Of course a visual pointer can also be used instead of a text message to make it easier for different language versions and even color blind users.

In order to derive the calibration coordinates of N points we use the formula:

$$Rn=\{PnX,PnY\}.$$

PnX and PnY are calculated by simply iterating through a buffer of the pixel color values taken from the camera 41 to look for the reference icons 80 of (approximately) the expected size and color. Once all reference icons 80 have been displayed and identified, it is then possible to determine the relative position of the aim point 15 on the display 20.

The relative position of a target to those of reference points R1 . . . RN are arbitrary. However it is logical to base such on a most central point of all the reference icons 80. This is likely to be somewhere near the center of the display 20. In the case of the 3 coordinates in FIG. 2 being assigned to R1, R2 and R3 the target center TX,TY might be located as follows in its 'default' position:

$$TX=(R2X-R1X)/2+R1X$$

$$TY=(R3Y-R1Y)/2+R1Y$$

If more reference points are used, an average can be created to attempt to reduce errors or references that get missed due to imaging errors. For example the same values can be calculated as follows:

$$TXc=(R3X-R2X)/2+R3X$$

$$TYc=(R3Y-R1Y)/2+R1Y$$

We can simply calculate an average of this by the formulae:

$$TXaverage=TX+TXc/2$$

$$TYaverage=TY+TYc/2$$

For an increasing number of reference points N we have a total number of target reference calculations C for both X and Y as long as every reference has a different X and Y than every other reference point, using combination theory as follows:

Where N is the amount of dissimilar reference points, and k is 2. I.e.

$$N!/(2(N-2)!$$

Any rotation of the camera 41 in relation to the display 20 can be calculated creating an X and a Y plane plotting through two reference points having the same value. For example in FIG. 2 we have deliberately chosen 3 points as opposed to two, as P1Y and P3Y are the same, therefore if these references have different X,Y values we know the display 20 and the camera 41 are at an angle. A simple Pythagorean calculation can be used to compensate for this rotation. The same is true of P1X and P2X. In fact this is another reason we chose three reference points in our image, having a combination of similar X and Y and dissimilar X and Y gives us the best way to calculate both the target coordinates and rotation. Again combination theory can be used to calculate how many reference planes (i.e. a combination of two similar X or Y references) there are for a given number of reference points.

By making the reference points a secondary color, an extra level of information encoding can be added. For example, if a reference point is red circle of RGB value of {255, 0, 0} then we could add a graduated blue to offset errors due to rotation or aspect ratio differences. For example, the blue content of the reference icon 80 can be gradually increased from left to right. For example: {255,0, 0}, {255, 10, 0}, {255, 20, 0} . . . {255, 255, 0}

Figure 3:
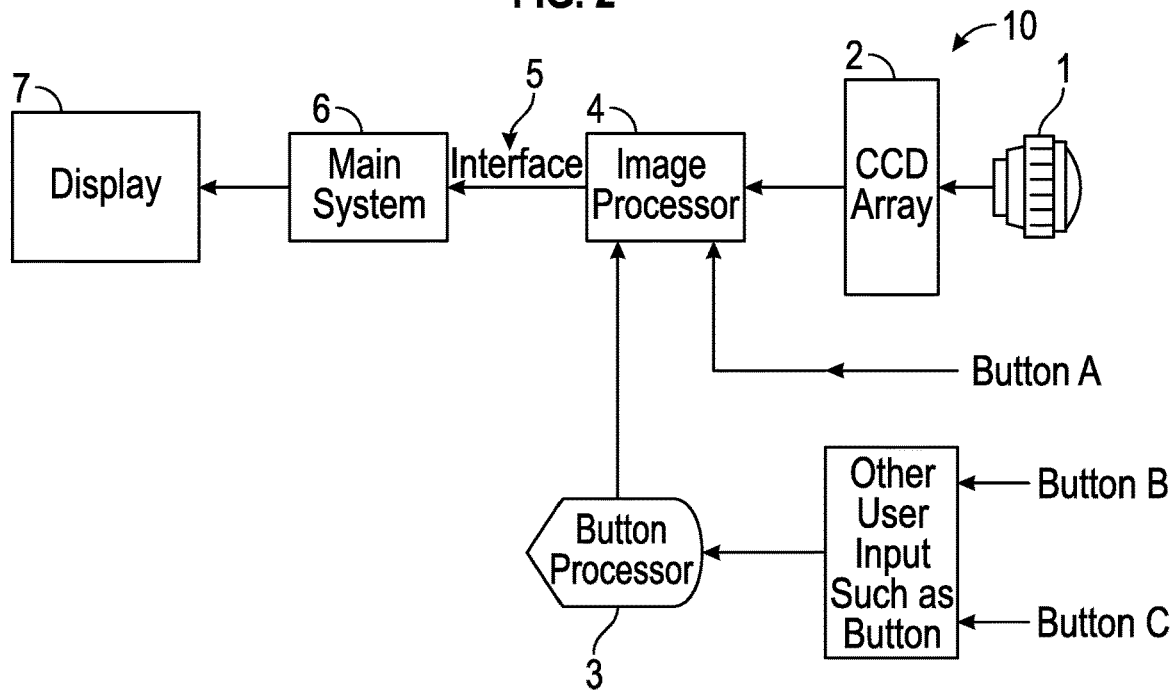
FIG. 3 is a diagram of a camera system of the invention.

FIG. 3 is a diagrammatic representation of a one possible camera 41 unit connectivity. In FIG. 3:

1. A lens 1 is usually required to focus the image in question. A fixed lens 1 is likely to be used for cost, but could be a variable focus lens 1.

2. A CCD array 2 converts light into an array of ones and zeros depending on the light and color focused through the lens 1.

3. Many inexpensive chipsets have a one-button input, which can be used as a trigger or button on the device corresponding to the user input 45. In order to create more user inputs 45, an inexpensive microcontroller 3 can be used to multiplex several inputs into an audio signal. This audio signal is then passed to image processor 4 as an audio input, the audio input is then demultiplexed at the other end of the interface 5 on the main system 6.

4. A Microcontroller 4 or similar (ASIC, FPGA etc.) processing chip is used to convert the image from the CCD array 2 to a format ready for sending to the main system 6. These are often available inexpensively and utilize a common format such as MJPEG, JPEG or the like. Alternately the microcontroller 4 can pre-process the reference icons 80 and send the coordinates to the microcomputer 30, to reduce transfer and processing times by reducing the amount of data to a minimum.

5. The interface 5 can be one of numerous communication systems currently available to transfer the image (or reference point or points) information back to the microcomputer 30. One method is to use a physical cable and a protocol such as USB. This would make it easy to use existing chipsets for the button processor 3. A wireless protocol such as Bluetooth would likely be more convenient for the user. Using a pre-calculated reference point method even infrared transfer could be used.

6. The Main System 6 contains the main processor 32, and this will preferably convert the information taken from the camera 41 and convert it into actual co-ordinates on the screen. This will then be passed in some common manner such to the application software which will process the co-ordinates to perform the function, such as show cross hairs on the display screen 20 at the aim point 15.

In choosing the camera 41 system we have two main parameters: frame rate and resolution. A slower frame rate results in a visible lag between the target (or cursor) and the user's movement. This is often seen on slower light guns and, during gameplay, can be annoying. Ideally the frame should be captured, sent to the device and the target position target_X and target_Y calculated) within one frame.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A system for detecting an aim point on a display screen targeted by a user, comprising:
    a microcomputer having at least a power source, a processor, a non-volatile memory, an I/O interface, and a display output;
    a hand-held enclosure that includes a camera having a field-of-view defined by an X-axis and a Y-axis, a user input, and a microcomputer interface to transmit camera data and user input data to the microcomputer, an aim point being a point located centrally in the field-of-view at a value target_X along the X-axis and a value target_Y along the Y-axis;
    the processor adapted to follow software instructions to perform the steps:
    a) display two or more reference icons on the display screen;
    b) detect the reference icons using an image captured with the camera and sent to the microcomputer via the I/O interface, the enclosure being held by the user while orienting the camera towards the display screen;
    c) calculate an aim point relative position on the display screen based at least in part on the position of the reference points within the field-of-view of the camera;
    e) performing a function based on user input settings and the calculated value of the aim point;
    f) repeating from step a) until stopped by the user.

2. The system of claim 1 wherein the processor is adapted to following software instructions to perform the additional step:
    d) display an icon on the display screen at the aim point.

3. The system of claim 1 wherein the processor is adapted to following software instructions to perform the step:
    f) display one or more images on the display screen corresponding to the user input and the aim point proximate the aim point.

4. The system of claim 1 wherein the hand-held enclosure takes the form of a gun or other weapon.

5. The system of claim 1 wherein the reference icons include orientation information, and wherein the processor is adapted to following software instructions to perform the step:
    c') calculate the aim point on the display screen based at least in part on the orientation information within the reference icons.

6. The system of claim 5 wherein the orientation information includes a color gradient detectable by the system in order to assist in the calculation of orientation.

7. The system of claim 6 wherein the reference icons are of various shapes, which can be symmetrical or non-symmetrical, in order to relay further orientation information to the system.

8. A processor-implemented method for detecting an aim point on a display screen targeted by a user, comprising the steps:
   a) providing a microcomputer having a power source, a processor, a non-volatile memory, an I/O interface, and a display output; a hand-held enclosure that includes a camera having a field-of-view defined by an X-axis and a Y-axis, a user input, and a microcomputer interface to transmit camera data and user input data to the microcomputer, an aim point being a point located centrally in the field-of-view at a value target_X along the X-axis and a value target_Y along the Y-axis;
   b) the processor displaying two or more reference icons on the display screen;
   c) the processor detecting the reference icons using an image captured with the camera and sent to the microcomputer via the I/O interface, the enclosure being held by the user while orienting the camera towards the display screen;
   d) the processor calculating the aim point relative position on the display screen based at least in part on the position of the reference icons within the field-of-view of the camera;
   f) perform a function based on the user input settings and the calculated value of the aim point;
   g) the processor displaying one or more images on the display screen corresponding to the user input and the aim point;
   h) the processor repeating from step c).

9. The processor-implemented method of claim 8 further including the step:
   d) the processor displaying an icon on the display screen proximate the aim point.

10. The processor-implemented method of claim 8 further including the step:
   f) the processor displaying one or more images on the display screen corresponding to the user input and the aim point proximate the aim point.

11. The processor-implemented method of claim 8 wherein the reference icons include orientation information, and further including the step:
   c') the processor calculating the aim point on the display screen based at least in part on the orientation information within the reference icons.

12. The processor-implemented method of claim 11 wherein the orientation information includes a color gradient detectable by the camera.

13. A non-transitory computer-readable storage medium storing a set of instructions that, when executed by a processor in a microcomputer that further includes a power source, a non-volatile memory, an I/O interface, and a display output; a hand-held enclosure that includes a camera having a field-of-view defined by an X-axis and a Y-axis, a user input, and a microcomputer interface to transmit camera data and user input data to the microcomputer, an aim point being a point located centrally in the field-of-view at a value target_X along the X-axis and a value target_Y along the Y-axis; cause the processor to perform operations, comprising the steps:
   b) displaying two or more reference icons on the display screen;
   c) detecting the reference icons using an image captured with the camera and sent to the microcomputer via the I/O interface, the enclosure being held by the user while orienting the camera towards the display screen;
   d) calculating the aim point relative position on the display screen based at least in part on the position of the reference points within the field-of-view of the camera;
   f) performing a function based on the user input settings and the calculated vale of the aim point;
   g) displaying one or more images on the display screen corresponding to the user input and the aim point;
   h) repeating from step c).

14. The A non-transitory computer-readable storage medium of claim 13 wherein the set of instructions, when executed by the processor, cause the processor to perform operations that comprise the further step:
   d) displaying an icon on the display screen at the aim point.

15. The A non-transitory computer-readable storage medium of claim 13 wherein the set of instructions, when executed by the processor, cause the processor to perform operations that comprise the further step:
   f) displaying one or more images on the display screen corresponding to the user input and the aim point proximate the aim point.

16. The A non-transitory computer-readable storage medium of claim 13 wherein the set of instructions, when executed by the processor, cause the processor to perform operations that comprise the further step:
   c') calculating the aim point on the display screen based at least in part on orientation information within the reference icons.

17. The A non-transitory computer-readable storage medium of claim 7 wherein the set of instructions, when executed by the processor, cause the processor to perform operations that comprise the further step:
   c') calculating the aim point on the display screen based at least in part on orientation information within the reference icons, the orientation information including a color gradient detectable with the camera.

* * * * *